(12) United States Patent
Torii

(10) Patent No.: US 10,030,661 B2
(45) Date of Patent: Jul. 24, 2018

(54) ELECTRIC PUMP

(71) Applicant: Aisan Kogyo Kabushiki Kaisha, Obu-shi (JP)

(72) Inventor: Hidemasa Torii, Anjo (JP)

(73) Assignee: Aisan Kogyo Kabushiki Kaisha, Obu-Shi (JP)

( * ) Notice: Subject to any disclaimer, the term of this patent is extended or adjusted under 35 U.S.C. 154(b) by 366 days.

(21) Appl. No.: 14/827,753

(22) Filed: Aug. 17, 2015

(65) Prior Publication Data

US 2016/0047382 A1 Feb. 18, 2016

(30) Foreign Application Priority Data

Aug. 18, 2014 (JP) ................. 2014-166056

(51) Int. Cl.
| | |
|---|---|
| *F04B 35/04* | (2006.01) |
| *F04D 13/06* | (2006.01) |
| *H02K 1/27* | (2006.01) |
| *H02K 1/32* | (2006.01) |
| *F04D 1/00* | (2006.01) |
| *F04D 29/58* | (2006.01) |

(52) U.S. Cl.
CPC ........... *F04D 13/0606* (2013.01); *F04D 1/00* (2013.01); *F04D 29/588* (2013.01); *H02K 1/2706* (2013.01); *H02K 1/278* (2013.01); *H02K 1/32* (2013.01)

(58) Field of Classification Search
CPC ...... F04D 13/0606; F04D 29/588; F04D 1/00; H02K 1/2706; H02K 1/278; H02K 1/28; H02K 1/30; H02K 1/32

USPC ................................................. 417/369, 370
See application file for complete search history.

(56) References Cited

U.S. PATENT DOCUMENTS

| | | | | |
|---|---|---|---|---|
| 2,394,517 | A * | 2/1946 | Ingalls ..................... | H02K 9/18 |
| | | | | 310/60 R |
| 2,925,041 | A * | 2/1960 | Sigmund ............. | F04D 15/0094 |
| | | | | 310/63 |
| 5,248,275 | A * | 9/1993 | McGrath ................ | A63H 27/10 |
| | | | | 137/512.15 |

(Continued)

FOREIGN PATENT DOCUMENTS

| | | |
|---|---|---|
| JP | S550023343 A | 2/1980 |
| JP | 2006-214407 A | 8/2006 |
| JP | 2014-013002 | 1/2014 |

*Primary Examiner* — Charles Freay
(74) *Attorney, Agent, or Firm* — Shumaker, Loop & Kendrick, LLP

(57) ABSTRACT

A rotor of an electric pump may include a body having an inner circumferential surface encircling a shaft; and a magnet located in a motor chamber of a storage space of the pump, and arranged so as to be (i) separated from an outer circumferential surface of the body with an interval in between and (ii) separated from a stator of the pump with an interval in between. The interval between the magnet and the body may communicate the motor chamber and a pump chamber of the storage space. The body may include a groove extending from an end of the inner circumferential surface of the body to the pump chamber. The rotor may further comprise a wall disposed in the interval between the magnet and the outer circumferential surface of the body and at a position being different from the groove in a rotation direction of the rotor.

7 Claims, 8 Drawing Sheets

(56) References Cited

U.S. PATENT DOCUMENTS

| | | | | |
|---|---|---|---|---|
| 5,641,275 A | * | 6/1997 | Klein | F04D 29/0413 |
| | | | | 415/176 |
| 2002/0098089 A1 | * | 7/2002 | Forsberg | F04D 15/0218 |
| | | | | 417/63 |
| 2009/0142203 A1 | * | 6/2009 | De Filippis | F04D 25/082 |
| | | | | 417/353 |
| 2014/0265692 A1 | * | 9/2014 | Schneider | F04D 29/047 |
| | | | | 310/104 |
| 2016/0025095 A1 | * | 1/2016 | Hattori | F01P 5/12 |
| | | | | 417/423.13 |

* cited by examiner

ELECTRIC PUMP

CROSS-REFERENCE TO RELATED APPLICATION

This application claims priority to Japanese Patent Application No. 2014-166056 filed on Aug. 18, 2014, the contents of which are hereby incorporated by reference into the present application.

TECHNICAL FIELD

Teachings disclosed herein relate to an electric pump configured to pressurize and discharge fluid.

DESCRIPTION OF RELATED ART

Japanese Patent Application Publication No. 2006-214407 discloses a canned motor pump. The canned motor pump includes a canned motor and a pump portion. The pump portion includes a casing, an intake opening, a discharging opening, a pump chamber, and an impeller. The pump chamber is formed in the casing and houses the impeller. Rotation of the impeller by the canned motor causes fluid to flow into the pump chamber through the intake opening and be discharged out of the pump chamber through the discharging opening. The canned motor includes a rotor configured to rotate the impeller and a fixed axle configured to rotatably support the rotor. Formed between the rotor and the fixed axle is a flow pathway through which the liquid passes. Some of the fluid having flowed into the motor chamber enters the flow pathway.

SUMMARY

The technology described above may allow foreign bodies (e.g., pieces of metal, resin, etc.) in the liquid, if there is any, to enter a space between the rotor and the fixed axle. The entry of foreign bodies into the space between the rotor and the fixed axle hampers the rotation of the rotor.

The present specification provides a technology for making it possible to prevent foreign bodies from entering a space between a rotor and a shaft.

An electric pump disclosed herein may be configured to pressurize and discharge fluid, and comprise: a casing including an intake opening and a discharging opening, and defining a storage space including a pump chamber and a motor chamber, the pump chamber communicating with the intake opening and the discharging opening, and the motor chamber communicating with the pump chamber; a stator attached to the casing; a shaft disposed in the storage space; and a rotor disposed in the storage space and attached rotatably to the shaft. The rotor may comprise a body including an inner circumferential surface encircling the shaft; and a magnet located in the motor chamber. The magnet may be arranged so as to be separated from an outer circumferential surface of the body with an interval in between, and be separated from the stator with an interval in between. The interval between the magnet and the outer circumferential surface of the body may communicate the motor chamber and a low pressure area of the pump chamber. The body may include a groove extending from a motor chamber side end of the inner circumferential surface of the body to the pump chamber along the shaft. The rotor may further comprise a wall disposed in the interval between the magnet and the outer circumferential surface of the body and at a position that is different from the groove in a rotation direction of the rotor, and extending from a motor chamber side end of the outer circumferential surface of the body toward the pump chamber.

Normally, the electric pump is used with the storage space filled with fluid. Rotation of the rotor causes the fluid outside the casing to be sucked into the pump chamber through the intake opening. In the pump chamber, a pressure of the fluid is comparatively low near a center of rotation of the rotor and increases as it is farther away from the center of rotation. When pressurized, the fluid is discharged out of the pump chamber through the discharging opening. Some of the fluid thus pressurized flows into the motor chamber communicating with the pump chamber from outside the rotor. The fluid having flowed into the motor chamber flows toward a low pressure side, i.e. toward the center of rotation of the rotor. The interval between the magnet and the outer circumferential surface of the body is located outside the groove disposed at the inner circumferential surface of the body. This in turn allows the fluid to flow into the interval between the magnet and the outer circumferential surface of the body. The fluid may be prevented from flowing into the groove. Therefore the foreign bodies in the fluid may be prevented from entering the space between the rotor and the shaft.

Further, the wall is disposed in the interval between the magnet and the outer circumferential surface of the body. The wall causes the fluid having flowed into the interval between the magnet and the outer circumferential surface of the body to rotate as the rotor rotates. This in turn causes the foreign bodies in the fluid to move toward an inner circumferential surface of the magnet, i.e. in a direction away from the space between the rotor and the shaft. This makes it possible to prevent the foreign bodies in the fluid from entering the space between the rotor and the shaft.

DETAILED DESCRIPTION

Figure 1:
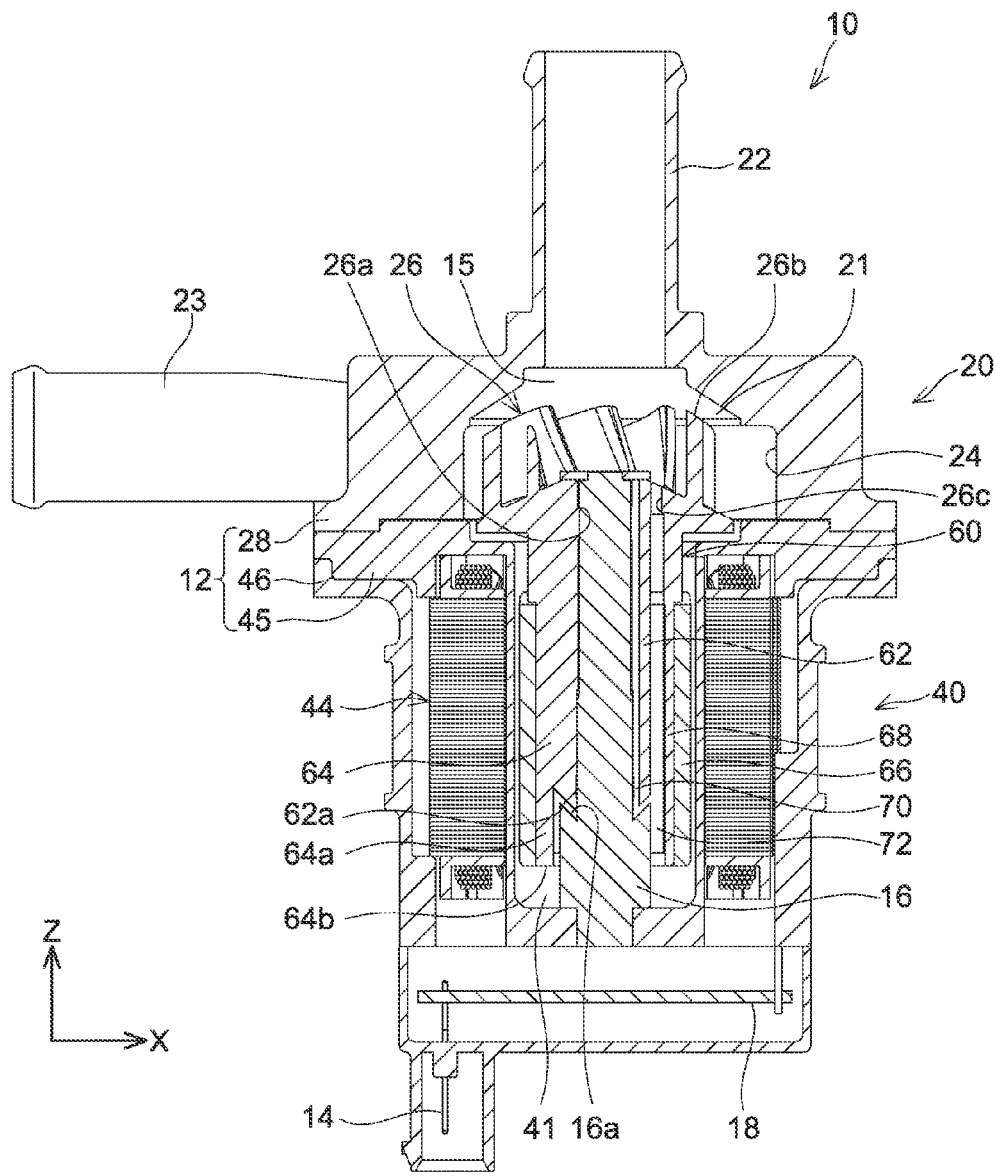
FIG. 1 is a schematic sectional view of an electric water pump according to a first embodiment.

Some of the features characteristic to below-described embodiments will herein be listed. It should be noted that the respective technical elements are independent of one another, and are useful solely or in combinations. The combinations thereof are not limited to those described in the claims as originally filed.

(Feature 1) In the electric pump, the wall may project from the outer circumferential surface of the body toward the magnet. This configuration enables the wall to cause foreign body movement towards the magnet, i.e. in a direction away from the space between the rotor and the shaft.

(Feature 2) In the electric pump, the wall may divide the interval between the magnet and the outer circumferential surface of the body into a plurality of spaces.

(Feature 3) In the electric pump, the wall may extend towards a side opposite to the pump chamber at a greater degree than a motor chamber side end of the outer circumferential surface of the body. This configuration makes it possible to place an end of the wall on a motor chamber side away from an end of the groove on the motor chamber side. This in turn makes it possible to prevent foreign bodies from entering the groove due to a turbulent flow that may be generated near the end of the wall on the motor chamber side (i.e., away from the end of the groove on the motor chamber).

(Feature 4) In the electric pump, the wall may comprise a face facing forward in the rotation direction of the rotor, and the face may be inclined more forward relative to the rotation direction of the rotor as the face extends from a motor chamber side toward a pump chamber side. This configuration makes it possible to smoothly deliver the fluid from the motor chamber side to the pump chamber side.

(Feature 5) In the electric pump, the wall may comprise a plurality of the walls placed at intervals in the rotation direction of the rotor, and a length of each of the walls along the rotation direction of the rotor may be greater as the wall extends from a motor chamber side toward a pump chamber side. This configuration causes the interval between adjacent walls to become narrower as the walls extend from the motor chamber side to the pump chamber side. This in turn makes it possible to increase the flow rate of the fluid flowing from the motor chamber side toward the pump chamber side through the space between the adjacent walls. This configuration makes it possible to smoothly deliver the fluid from the motor chamber side to the pump chamber side.

(Feature 6) The electric pump may further comprise a flow passage communicating with a motor chamber side end of the groove and the motor chamber. A motor chamber side end of the flow passage may be located closer to the pump chamber than a groove side end of the flow passage. This configuration makes it possible to prevent the fluid flowing from the motor chamber toward the pump chamber from flowing into the groove.

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved electric pumps, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Embodiments

First Embodiment (Configuration of Electric Water Pump 10)

An electric water pump 10 is for example installed in an engine room of a vehicle, such as an automobile, and used to circulate cooling water that cools an engine, an inverter, and the like. As shown in FIG. 1, the electric water pump 10 comprises a pump portion 20 and a motor portion 40. An outer circumference of the electric water pump 10 is formed by a casing 12. The casing 12 comprises an upper casing 28, a middle casing 45, and a lower casing 46. The casing 12 defines a storage space 15. The storage space 15 comprises a pump chamber 21 and a motor chamber 41.

(Configuration of Pump Portion 20)

The pump portion 20 is provided in the upper casing 28. In the pump portion 20, an intake opening 22, a discharging opening 23, and the pump chamber 21 are formed by the upper casing 28. Further, the pump portion 20 includes an impeller 26.

The impeller 26 is housed in the upper casing 28. The impeller 26 has a circular shape as seen from an upper side of FIG. 1. The impeller 26 has a through-hole 26a in a center portion of the impeller 26. A shaft 16 is inserted in the through-hole 26a of the impeller 26a. Supply of electric power to the electric water pump 10 causes the impeller 26 to rotate in a clockwise direction (hereinafter referred to as "rotation direction R") as seen from a lower side of FIG. 1. The impeller 26 includes a plurality of blades 26b placed at regular intervals on a top side of the impeller 26. The impeller 26 includes a plurality of balance holes 26c penetrating vertically through the impeller 26. The plurality of balance holes 26c is disposed near a center of the impeller 26. The pump chamber 21 includes a cooling water pathway 24 formed between an outer circumferential surface of the impeller 26 and an inner circumferential surface of the upper casing 28.

The cooling water pathway 24 is shaped in conformance with an outer circumference of the impeller 26 (i.e. the rotation direction R). When seen in a cross-section parallel to an X-Y plane, the inner circumferential surface of the upper casing 28 becomes gradually farther away from the outer circumference of the impeller 26 as the inner circumferential surface of the upper casing 28 extends in the rotation direction R. This causes the cooling water pathway 24 to have a pathway area that becomes gradually larger as the cooling water pathway 24 extends in the rotation direction R. The discharging opening 23 is connected to the cooling water pathway 24 at a part of the cooling pathway 24 having the largest pathway area. The discharging opening 23 extends in a tangential direction of the cooling water pathway 24. The cooling water pathway 24 encircles the impeller 26.

Furthermore, as shown in FIG. 1, the intake opening 22 is connected to the cooling water pathway 24. The intake opening 22 is formed at an upper end of the pump portion 20. The intake opening 22 is located on an extension of a central axis of the impeller 26.

(Configuration of Motor Portion 40)

The motor portion 40 is disposed below the pump portion 20. The motor portion 40 is a three-phase brushless motor. In the motor portion 40, the motor chamber 41 is formed by the middle casing 45. The middle casing 45 is in liquid-tight contact with a lower end of the upper casing 12. The middle casing 45 has a tubular portion therein that forms the motor chamber 41. The motor portion 40 is a brushless motor including the shaft 16, a rotor 60, a stator 44, and a control circuit 18.

The stator 44 is disposed in a space between the middle casing 45 and the lower casing 46, which has a tubular shape, in a liquid-tight manner with respect to the motor 41. FIG. 1 shows a longitudinal cross-section of the stator 44, but for ease of viewing the drawing, omits to show hatchings that represent such a cross-section. The stator 44 has a tubular shape. The stator 44 includes a core formed by a plurality of core plates stacked on top of each other. The core is provided with a plurality of teeth, on each of which a coil wire is wound around. Tips of the teeth are located at an inner circumferential edge of the stator 44.

The stator 44 is electrically connected to the control circuit 18 disposed at a lower end of the motor portion 40. The control circuit 18 controls supply of electric power to the stator 44. The control circuit 18 is connected to an external power source (not shown; e.g. a battery mounted on a vehicle) via a terminal 14. The control circuit 18 supplies the stator 44 with electric power supplied from the external power source.

The shaft 16 is disposed in the storage space 15. The shaft 16 extends vertically in the casing 12. The shaft 16 has its upper end reaching the pump portion 20. The shaft 16 has its lower end fixed to the middle casing 45 of the stator 44. That is, the shaft 16 extends from the motor chamber 41 to the pump chamber 21. The rotor 60 is attached rotatably to the shaft 16. The shaft 16 includes, at an intermediate position thereof, an opposed surface 16a inclined downward to the center of the shaft 16.

(Configuration of Rotor 60)

Figure 2:
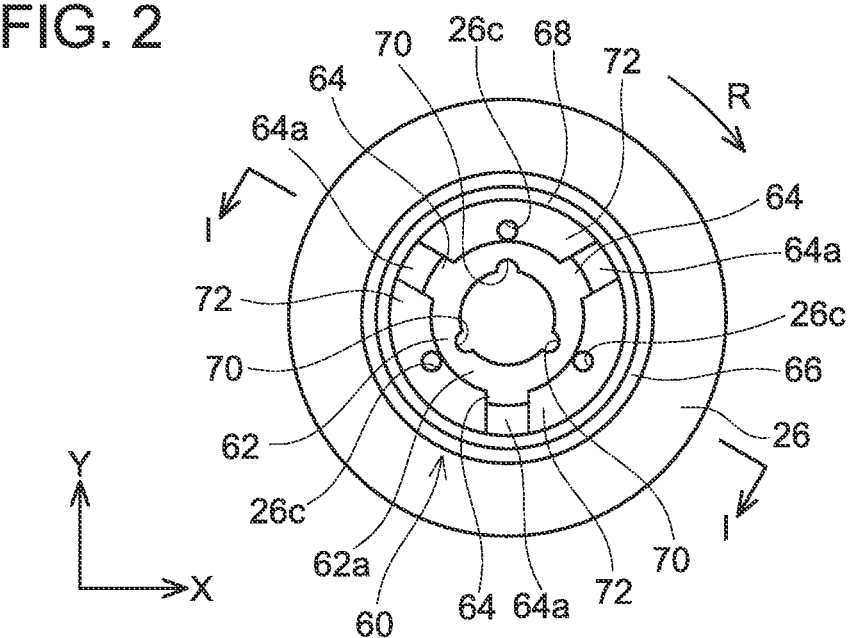
FIG. 2 is a bottom view of a rotor according to the first embodiment.

A configuration of the rotor 60 is described with reference to FIGS. 1 and 2. The rotor 60 is housed in the motor chamber 41. The rotor 60 is fixed to a lower surface of the impeller 26. The rotor 60 includes a body 62, a plurality of walls 64, a magnet 66, and a tubular portion 68. The body 62 projects downward from the lower surface of the impeller 26, and is housed in the motor chamber 41. The body 62 has a tubular shape that has a same central axis as that of the shaft 16. The body 62 has its inner circumferential surface facing an outer circumferential surface of the shaft 16 and surrounding the shaft 16. The inner circumferential surface of the body 62 is continuous with an inner circumferential surface of the through-hole 26a of the impeller 26.

The body 62 includes a plurality of lubrication grooves 70 disposed in the inner circumferential surface of the body 62. The lubrication grooves 70 are arranged so as to be separated from each other at intervals in a circumferential direction of the body 62. Each of the lubrication grooves 70 is depressed in a direction away from the outer circumferential surface of the shaft 16. Each of the lubrication grooves 70 extends in an axial direction of the shaft 16. The lubrication grooves 70 are formed in the inner circumferential surface of the body 62 and the inner circumferential surface of the through-hole 26a of the impeller 26. Specifically, the lubrication grooves 70 extend from a lower end of the body 62 (i.e. a motor chamber 41 side end) to an upper end of the impeller 26 beyond an upper end of the body 62 (i.e. a pump chamber 21 side end) and a lower end of the impeller 26.

The body 62 includes a tapered lower end face 62a inclined downward from an outer circumference of the body 62 toward an inner circumference of the body 62. The lower end face 62a is disposed parallel to the opposed surface 16a of the shaft 16. The lower end face 62a faces the opposed surface 16a with an interval in between.

Figure 3:
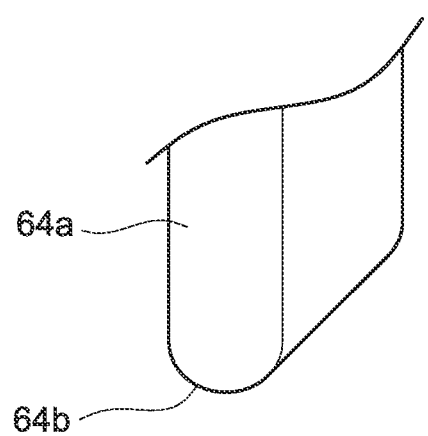
FIG. 3 is an enlarged view of a lower end of a wall according to the first embodiment.

The plurality of walls 64 is disposed on an outer circumferential surface of the body 62. The walls 64 are placed at regular intervals in the circumferential direction of the body 62. All of the walls 64 are disposed at positions that are different from those of the grooves 70 in the circumferential direction of the body 62. More specifically, each of the walls 64 is disposed in a middle of a space between two adjacent lubrication grooves 70. Alternatively, the walls 64 may not be disposed in the middle of the space between two adjacent lubrication grooves 70. Each of the walls 64 extends from the outer circumferential surface of the body 62 outward in a radial direction of the body 62. Each of the walls 64 has an end in contact with an inner circumferential surface of the tubular portion 68. The plurality of walls 64 divides a space between the tubular portion 68 and the body 62. Each of the walls 64 includes a lower end 64a located below the body 62. As shown in FIG. 3, the lower end 64a includes a lower end face 64b having a partially cylindrical shape.

As shown in FIG. 1, the tubular portion 68 extends downward from a lower end face of the impeller 26, and is housed in the motor chamber 41. The tubular portion 68 has a tubular shape that has a same central axis as that of the body 62. The inner circumferential surface of the tubular portion 68 faces the outer circumferential surface of the body 62 and surrounds the body 62. In this configuration, each of flow passages 72 is defined by the outer circumferential surface of the body 62, the inner circumferential surface of the tubular portion 68, and corresponding two adjacent walls 64. The flow passages 72 communicate with the balance holes 26c of the impeller 26, respectively. The tubular portion 68 has its lower end located at a same height as the lower end of each of the walls 64. In a modification, the tubular portion 68 may not have its lower end located at the same height as the lower end of each of the walls 64.

The magnet 66 is disposed outside the tubular portion 68. The magnet 66 is a permanent magnet having a tubular shape that has a same central axis as that of the tubular portion 68. The magnet 66 has its inner circumferential surface in contact with an outer circumferential surface of the tubular portion 68. Specifically, resin molding of the tubular portion 68 on the inner circumferential side of the magnet 66 allows integration of the magnet 66 and the tubular portion 68. This allows the tubular portion 68 to support the magnet 66 at outside the tubular portion 68. The magnet 66 has its south and north poles alternately arranged in a circumferential direction of the magnet 66.

(Operation of Electric Water Pump 10)

The following describes how the electric water pump 10 operates. The electric water pump 10, i.e. the pump chamber 21 and the motor chamber 41, is herein assumed to have been filled with cooling water in advance. The lubrication grooves 70 and the flow passages 72 are herein assumed to have been filled with cooling water in advance. When the vehicle is driven, electric power is supplied from the external power source to the electric water pump 10 via the terminal 14. The control circuit 18 applies voltage to the coil wires of the stator 44 in a predetermined order. This causes voltage of a same phase (i.e. a U phase, a V phase, or a W phase) to be applied to two of the teeth of the stator 44 that are opposed to each other with the shaft 16 interposed between the two teeth.

The application of voltage to the stator 44 causes the rotor 60 to rotate in the rotation direction R around the shaft 16. Since the lubrication grooves 70 are filled with cooling water, the rotor 60 can smoothly rotate around the shaft 16.

The impeller 26 rotates as the rotor 60 rotates. The rotation of the impeller 26 causes the cooling water to be sucked into the pump chamber 21 through the intake opening 22 and flow into the cooling water pathway 24. A pressure of the cooling water in the pump chamber 21 is lowest near the center of the impeller 26 and becomes higher toward the outer circumference of the impeller 26. Near the center of the impeller 26 is a low pressure area in which the cooling water has a comparatively low pressure. The cooling water in the cooling water pathway 24 flows in the rotation direction R through the cooling water pathway 24 while being pressurized by the rotation of the impeller 26, and is discharged out of the cooling water pathway 24 through the discharging opening 23. As a result of this, while the electric water pump 10 is operating, the pressure of the cooling water in the cooling water pathway 24 is highest in a vicinity of the discharging opening 23.

The cooling water pathway 24 communicates with the motor chamber 41. The cooling water in the cooling water pathway 24 that has been pressurized by the impeller 26 is higher in pressure than the cooling water in the motor chamber 41. This in turn causes a portion of the cooling water in the cooling water pathway 24 to flow from the cooling water pathway 24 into an outer circumferential portion of the motor chamber 41. This causes a pressure of the cooling water in the motor chamber 41 to be highest at an outer edge, i.e. a stator 44 side, of the motor chamber 41, and become lower on a closer side to the shaft 16. In the motor chamber 41, the cooling water flows downward along a circumferential surface of the rotor 60 and, below the rotor 60, flows from an outer circumferential side of the motor chamber 41 toward the shaft 16.

The flow passages 72 communicate with the area in the pump chamber 21 near the center of the impeller 26, i.e. with the low pressure area, via the balance holes 26c. This allows the cooling water near the lower end of the shaft 16 to flow upward from an interval between the tubular portion 68, the shaft 16, and two adjacent walls 64 to the flow passages 72. This configuration causes the cooling water having reached the area near the lower end of the shaft 16 to flow into the flow passages 72, thus making it hard for the cooling water to reach the shaft 16. This makes it possible to reduce an amount of the cooling water that reaches the lubrication grooves 70. The cooling water having flowed into the flow passages 72 flows through the flow passages 72 from a motor chamber 41 side to a pump chamber 21 side, i.e. in an upward direction. Then, the cooling water passes from the flow passages 72 through the balance holes 26c of the impeller 26 to the low pressure area of the pump chamber 21. As is evident from this configuration, the low pressure area represents an area in which the cooling water has a lower pressure than it does in the flow passages 72.

A circulation pathway of the cooling water through the electric water pump 10 (i.e. a pathway of the cooling water throughout the vehicle) may be contaminated with foreign bodies such as pieces of metal or resin that are left when the circulation pathway is being formed. Once sucked through the intake opening 22, these foreign bodies enter the motor chamber 41 in the process of flowing through the cooling water pathway 24. The flow into the lubrication grooves 70 of cooling water containing foreign bodies may cause the foreign bodies to get inside an interval between the shaft 16 and the body 62 and hamper a smooth rotation of the rotor 60. The electric water pump 10 can prevent the cooling water from flowing into the lubrication grooves 70 and thus prevent the foreign bodies contained in the cooling water from getting inside the interval between the shaft 16 and the body 62.

Further, the cooling water flows upward outside an outer circumference of an interval between the lower end face 62a of the body 62 and the opposed surface 16a of the shaft 16. The lower end face 62a and the opposed surface 16a are inclined downward from an outer circumferential edge of the body 62 toward the central axis of the shaft 16. That is, the interval between the lower end face 62a and the opposed surface 16a is inclined in a direction opposite to the direction in which the cooling water flows. This makes it hard for the cooling water to flow into the interval between the lower end face 62a and the opposed surface 16a. This configuration can prevent the cooling water from flowing into the lubrication grooves 70 via the interval between the lower end face 62a and the opposed surface 16a.

Further, all of the walls 64 are disposed at the positions that are different from those of the grooves 70 in the circumferential direction of the body 62. This can prevent the cooling water from flowing into the lubrication grooves 70 due to a turbulent flow that is generated as the walls 64 rotate. Furthermore, the lower end face 64b of each of the walls 64 has the partially cylindrical shape. This makes it possible to prevent the turbulent flow from being generated near the lower end face 64b. This can in turn prevent the cooling water from flowing into the lubrication grooves 70 via the interval between the lower end face 62a and the opposed surface 16a due to the turbulent flow.

Second Embodiment

Figure 4:
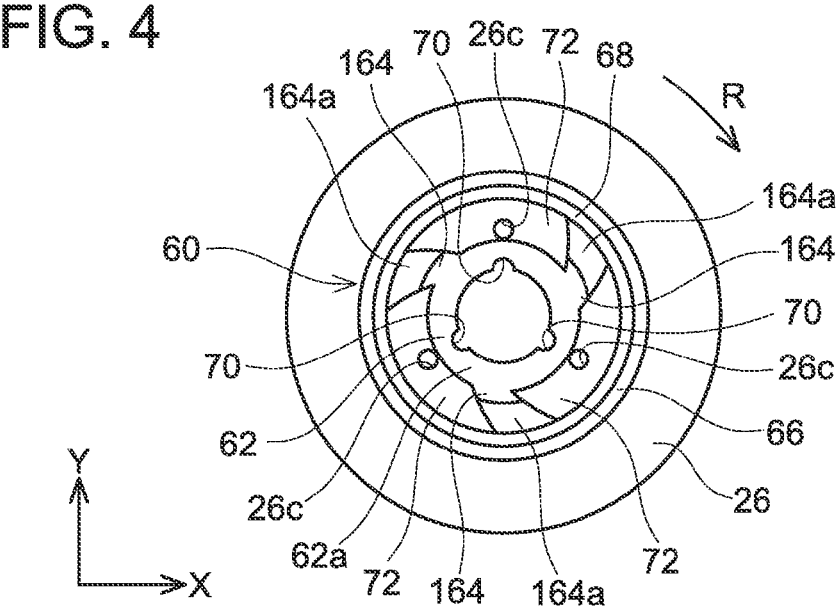
FIG. 4 is a bottom view of a rotor according to a second embodiment.

Aspects of difference from the first embodiment are described with reference to FIG. 4. In the present embodiment, the rotor 60 includes walls 164 instead of the walls 64. As shown in FIG. 4, each of the walls 164 extends from the outer circumferential surface of the body 62 to the inner circumferential surface of the tubular portion 68 as each of the walls 64 does. Each of the walls 164 has a lower end face 164a that extends downward from a same position as the lower end of the body 62 and that is similar to the lower end face 64b of each of the walls 64.

In a cross-section parallel to the X-Y plane, each of the walls 164 is curved to be located on a more opposite side to the rotation direction R as the wall 164 extends more from the body 62 toward the tubular portion 68. As a result of this, rotation of the rotor 60 enables foreign bodies in the cooling water to move toward the tubular portion 68, i.e. in a direction away from the shaft 16. This configuration makes it possible to suppress the foreign bodies from entering the space between the shaft 16 and the body 62.

Modification of Second Embodiment

Figure 5:
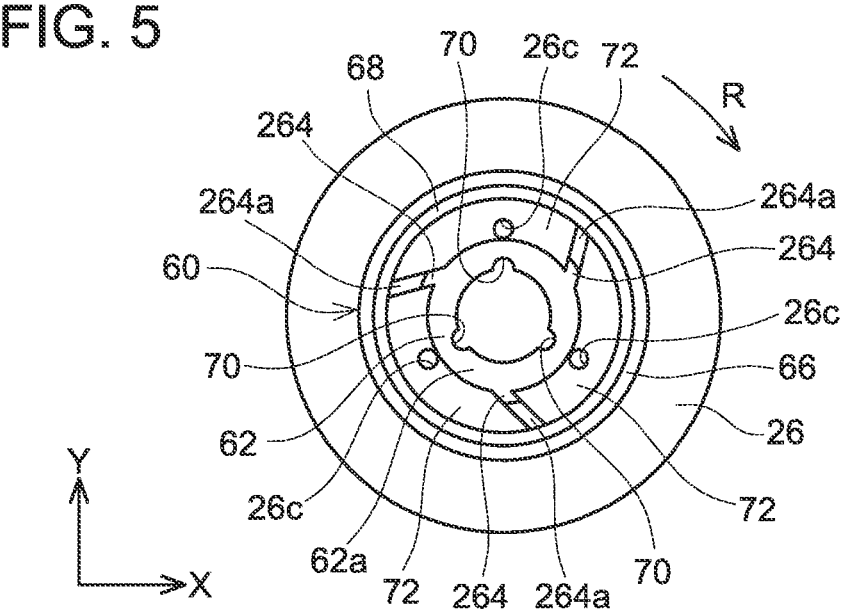
FIG. 5 is a bottom view of a rotor according to a modification of the second embodiment.

Each of the walls 164 of the second embodiment is curved. The walls alternatively may not be curved. For example, as shown in FIG. 5, the rotor 60 may include uncurved walls 264. Each of the walls 264 may have a lower end face 264a that is similar to the lower end face 164a.

Third Embodiment

Figure 6:
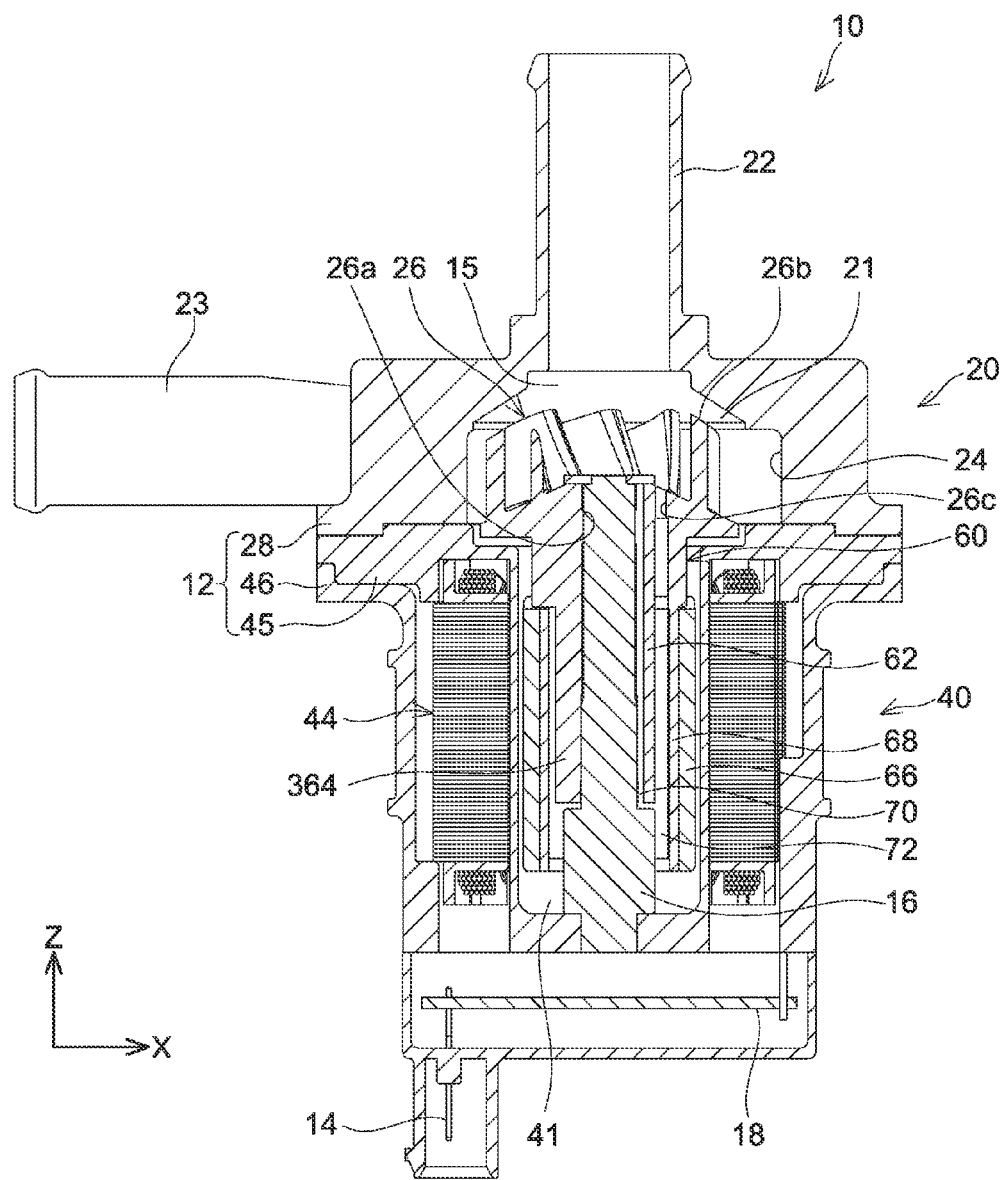
FIG. 6 is a schematic sectional view of an electric water pump according to a third embodiment.
Figure 7:
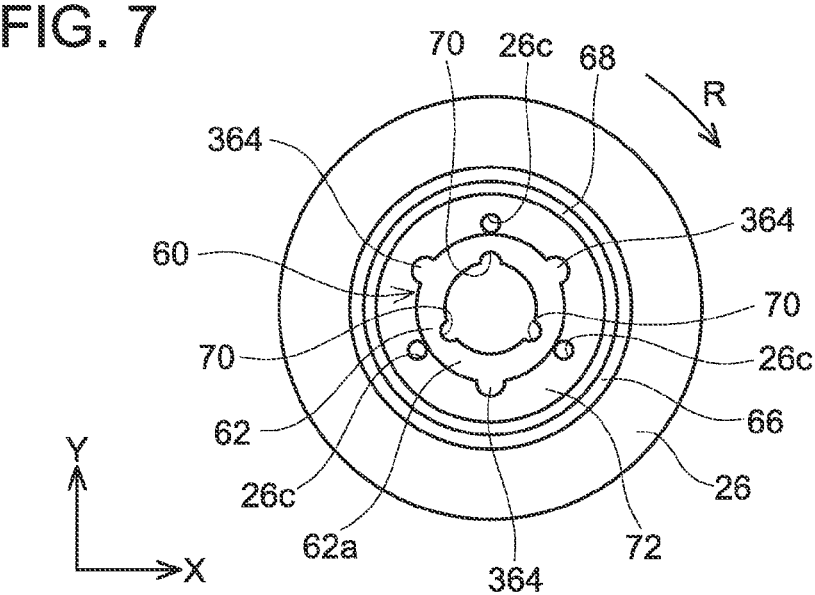
FIG. 7 is a bottom view of a rotor according to the third embodiment.

With reference to FIGS. 6 and 7, aspects of the differences from the first embodiment are described below. In the present embodiment, as shown in FIGS. 6 and 7, the rotor 60 includes walls 364 instead of the walls 64. As shown in FIG. 6, each of the walls 364 projects from the outer circumferential surface of the body 62 toward the tubular portion 68. Each of the walls 364 has a tubular portion 68 side end spaced from the tubular portion 68, and the tubular portion 68 side end does not divide the space between the tubular portion 68 and the body 62. The flow passage 72, present between the tubular portion 68 and the body 62, is not divided by the walls 364 and encircles the body 62. Each of the walls 364 has a lower end face located on a same level as the lower end face 62a of the body 62. The lower end face of each of the walls 364 has a partially cylindrical shape as the lower end face 64a does. As shown in FIG. 7, each of the walls 364 has a semicircular columnar shape.

Fourth Embodiment

Figure 8:
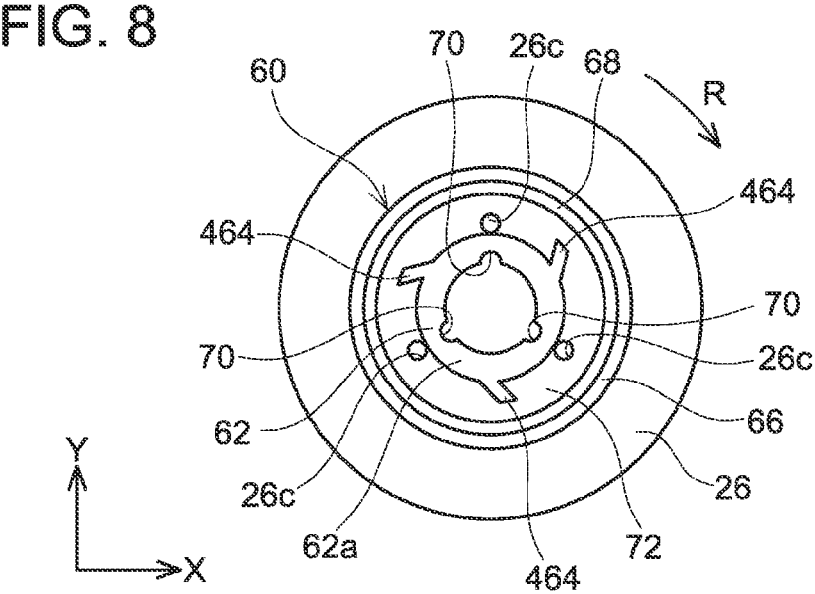
FIG. 8 is a bottom view of a rotor according to a fourth embodiment.

With reference to FIG. 8, aspects of the differences from the third embodiment are described below. In the present embodiment, as shown in FIG. 8, the rotor 60 includes walls 464 instead of the walls 364. As with each of the walls 364, each of the walls 464 projects from the outer circumferential surface of the body 62 toward the tubular portion 68, and is spaced from the tubular portion 68. Each of the walls 464 is inclined to be on a more opposite side to the rotation direction R as the wall 464 extends from the body 62 toward the tubular portion 68.

Fifth Embodiment

Figure 9:
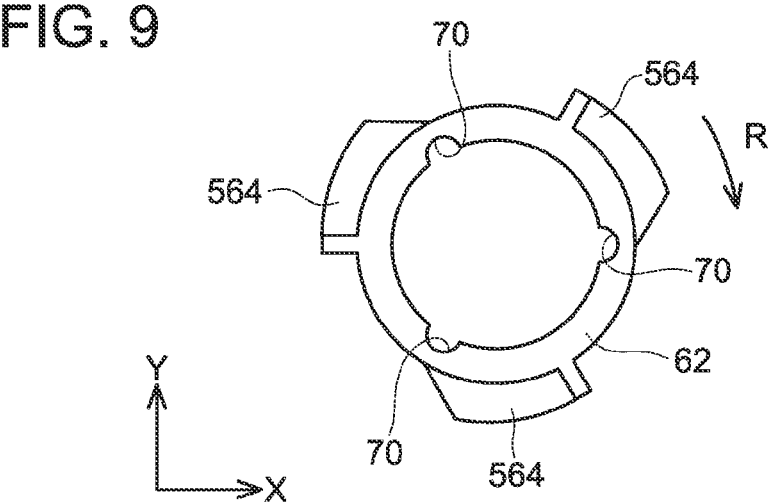
FIG. 9 is a bottom view of a body and walls according to a fifth embodiment.
Figure 10:
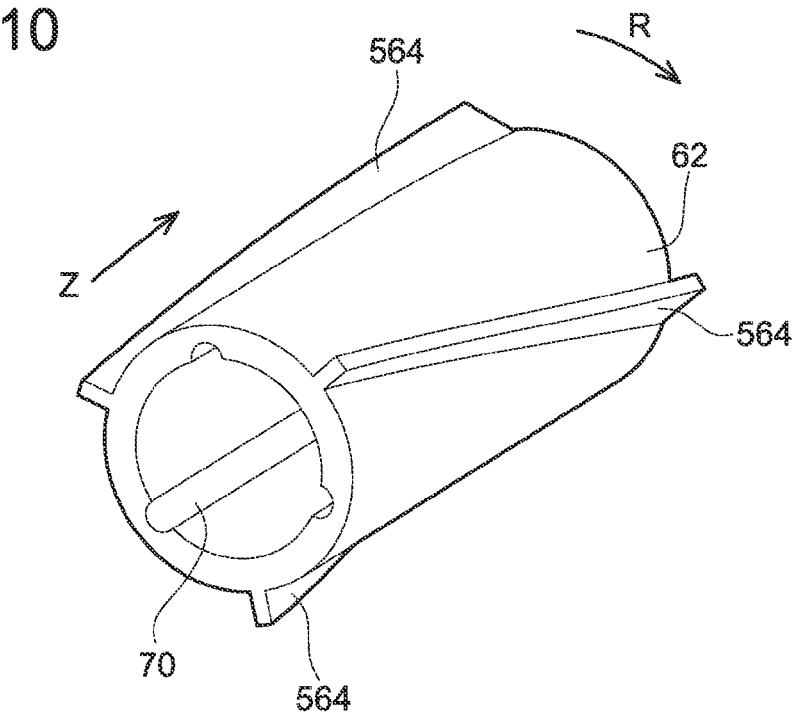
FIG. 10 is a perspective view of the body and walls according to the fifth embodiment.

With reference to FIGS. 9 and 10, aspects of the differences from the first embodiment are described below. FIGS. 9 and 10 show exclusively the body 62 and walls 564. In the present embodiment, the rotor 60 includes the walls 564 instead of the walls 64. Each of the walls 564 extends to the inner circumferential surface of the tubular portion 68. Each of the walls 564 is inclined in a Z-axis direction, i.e. in the rotation direction R from a motor chamber 61 side toward the pump chamber 21 side. This configuration enables the cooling water to smoothly flow toward the pump chamber 21 side.

Modification of Fifth Embodiment

Figure 11:
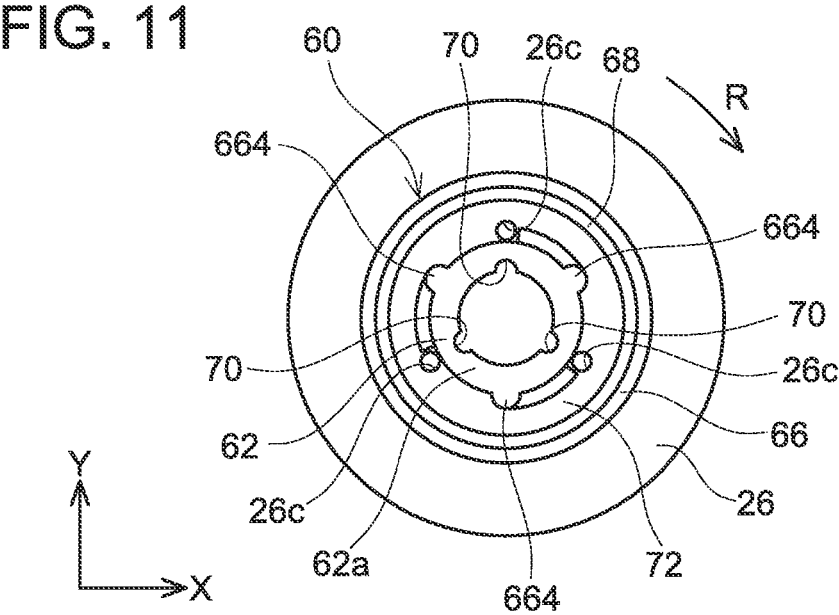
FIG. 11 is a bottom view of a rotor according to a modification of the fifth embodiment.

Each of the walls 564 of the fifth embodiment extends to the inner circumferential surface of the tubular portion 68. Alternatively, as shown in FIG. 11, the rotor 60 may include walls 664 spaced from the inner circumferential surface of the tubular portion 68. In this case, each of the walls 664 may have a semicircular shape in a cross-section parallel to the X-Y plane.

Sixth Embodiment

Figure 12:
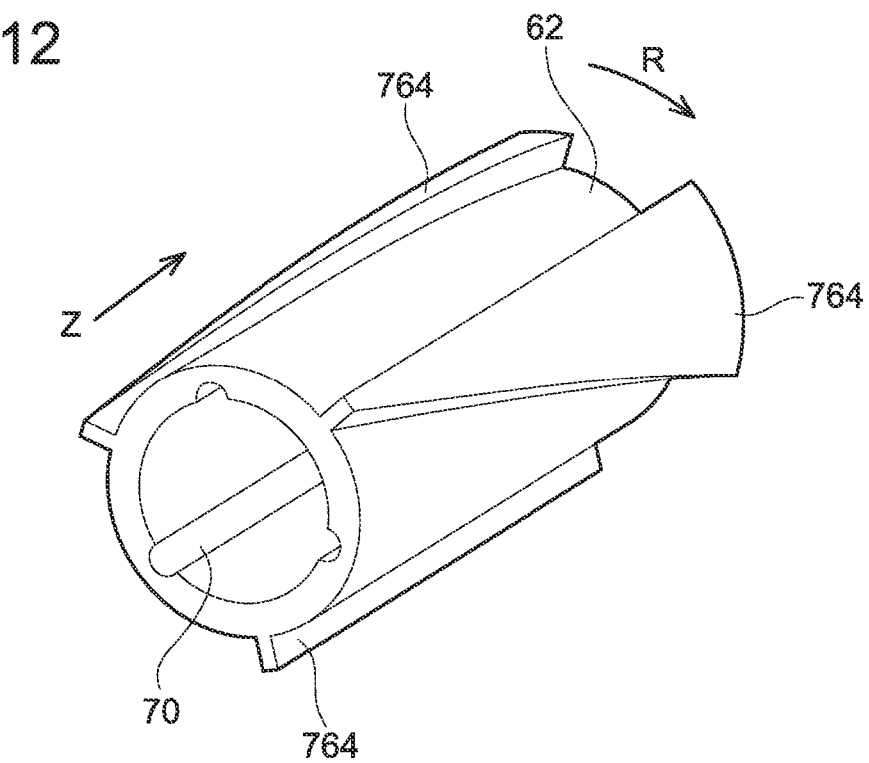
FIG. 12 is a perspective view of a body and walls according to a sixth embodiment.

With reference to FIG. 12, aspects of the differences from the first embodiment are described below. In the present embodiment, as shown in FIG. 12, the rotor 60 includes walls 764 instead of the walls 64. Each of the walls 764 extends wider in the rotation direction R as the wall 764 extends in a Z-axis direction, i.e. from the motor chamber 61 side toward the pump chamber 21 side. In other words, each of the walls 764 has a face located more towards a rotation direction R side and inclined to the rotation direction R side as the wall 764 is more on the rotation R side. In this configuration, a flow passage 72 has a flow passage area that becomes smaller as the flow passage 72 extends in the Z-axis direction. This configuration enables the cooling water to flow at a higher flow rate as it flows farther through the flow passage 72 toward the pump chamber 21 side. As a result of this, the cooling water can be caused to appropriately flow out into the pump chamber 21.

Figure 13:
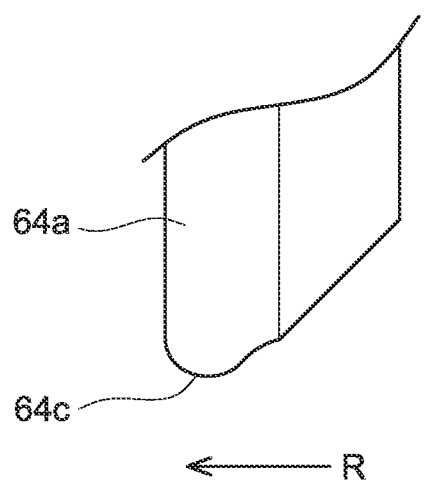
FIG. 13 is an enlarged view of a lower end of a wall according to a modification.
Figure 14:
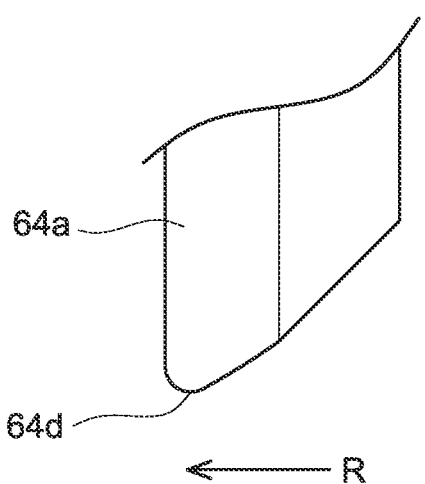
FIG. 14 is an enlarged view of a lower end of a wall according to a modification.

(1) In the first embodiment described above, the lower end face 64a of each of the walls 64 has a partially cylindrical shape. Alternatively, each of the walls 64 may include a lower end face 64c shown in FIG. 13 instead of the lower end face 64a. As the lower end face 64c extends in a direction opposite to the rotation direction R, the lower end face 64c may be curved downward and then curved upward in the opposite direction. Alternatively, each of the walls 64 may include a lower end face 64d shown in FIG. 14 instead of the lower end face 64a. The lower end face 64d may be curved downward as the lower end face 64d extends in the rotation direction R.

(2) In each of the embodiments described above, the rotor 60 includes the tubular portion 68 supporting the magnet 66. Alternatively, the rotor 60 may not include the tubular portion 68. In this case, for example, the rotor 60 may include a fixing member configured to fix the magnet 66 to the body 62.

(3) In each of the embodiments described above, the walls such as the walls 64 project from the outer circumferential surface of the body 62. Alternatively, the walls may be spaced from the body 62. In this case, the walls such as the walls 64 may extend downward from the lower end face of the impeller 26 and project from the tubular portion 68 toward the body 62.

(4) The "electric pump" disclosed herein may be used for fluids other than cooling water, such as fuel and drinking water. Further, the "electric pump" disclosed herein may include, for example, a brushed motor instead of the brushless motor.

What is claimed is:

1. An electric pump configured to pressurize and discharge fluid, the electric pump comprising:
   a casing including an intake opening and a discharging opening, and defining a storage space including a pump chamber and a motor chamber, the pump chamber communicating with the intake opening and the discharging opening, and the motor chamber communicating with the pump chamber;
   a stator attached to the casing;
   a shaft disposed in the storage space; and
   a rotor disposed in the storage space and attached rotatably to the shaft,
   wherein the rotor comprises:
      a body including an inner circumferential surface encircling the shaft; and
      a magnet located in the motor chamber, and arranged so as to be (i) separated from an outer circumferential surface of the body with an interval in between and (ii) separated from the stator with an interval in between, the interval between the magnet and the outer circumferential surface of the body communicates the motor chamber and a low pressure area of the pump chamber, the body includes a groove extending from a motor chamber side end of the inner circumferential surface of the body to the pump chamber along the shaft, and the rotor further comprises a wall disposed in the interval between the magnet and the outer circumferential surface of the body and at a position that is different from the groove in a rotation direction of the rotor, and extending from a motor chamber side end of the outer circumferential surface of the body toward the pump chamber.

2. The electric pump according to claim 1, wherein the wall projects from the outer circumferential surface of the body toward the magnet.

3. The electric pump according to claim 1, wherein the rotor further comprises a plurality of walls dividing the interval between the magnet and the outer circumferential surface of the body into a plurality of spaces.

4. The electric pump according to claim 1, wherein the wall comprises a motor chamber side end positioned opposite the pump chamber, and the motor chamber side end of the wall is located farther from the pump chamber than a motor chamber side end of the outer circumferential surface of the body.

5. The electric pump according to claim 1, wherein the wall comprises a face facing forward in the rotation direction of the rotor, and the face is inclined more forward relative to the rotation direction of the rotor as the face extends from a motor chamber side toward a pump chamber side.

6. The electric pump according to claim 1, wherein the wall comprises a plurality of the walls placed at intervals in the rotation direction of the rotor, and a length of each wall along the rotation direction of the rotor is greater as the wall extends from a motor chamber side toward a pump chamber side.

7. The electric pump according to claim 1, further comprising:

a flow passage communicating with a motor chamber side end of the groove and the interval between the magnet and the outer circumferential surface of the body, wherein one end of the flow passage is located closer to the pump chamber than another end of the flow passage, the one end of the flow passage contacts the interval between the magnet and the outer circumferential surface of the body, and the other end of the flow passage contacts the groove.

* * * * *